(12) United States Patent
Tseng et al.

(10) Patent No.: US 9,819,215 B2
(45) Date of Patent: Nov. 14, 2017

(54) WIRELESS CHARGING SYSTEM

(71) Applicant: HON HAI PRECISION INDUSTRY CO., LTD., New Taipei (TW)

(72) Inventors: Chuang-Wei Tseng, New Taipei (TW); Che-Hsun Chen, New Taipei (TW); Yu-Ching Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 163 days.

(21) Appl. No.: 14/802,690

(22) Filed: Jul. 17, 2015

(65) Prior Publication Data
US 2017/0018948 A1    Jan. 19, 2017

(51) Int. Cl.
*H02J 7/00* (2006.01)
*H01F 27/42* (2006.01)
*H02J 7/02* (2016.01)
*H04B 5/00* (2006.01)
*H02J 50/12* (2016.01)

(52) U.S. Cl.
CPC .............. *H02J 7/025* (2013.01); *H02J 50/12* (2016.02); *H04B 5/0037* (2013.01)

(58) Field of Classification Search
CPC .................................. H02J 7/025; H02J 50/00
USPC .......................................... 320/108; 307/104
See application file for complete search history.

(56) References Cited

U.S. PATENT DOCUMENTS

| | | | | |
|---|---|---|---|---|
| 4,949,016 A * | 8/1990 | De Bijl | ................. | H05B 41/28 315/208 |
| 7,336,513 B1 * | 2/2008 | Chen | ................. | H02M 7/538 363/132 |
| 8,942,624 B2 * | 1/2015 | Singh | ................. | H04B 5/0037 307/104 |
| 9,369,183 B2 * | 6/2016 | Nejatali | ............... | H04B 5/0043 |
| 9,383,244 B2 * | 7/2016 | Bishop | .................... | G01F 23/14 |
| 9,561,730 B2 * | 2/2017 | Widmer | ............... | B60L 11/182 |
| 2013/0127257 A1 * | 5/2013 | Yamamoto | .............. | H01F 38/14 307/104 |
| 2014/0159501 A1 * | 6/2014 | Kanno | .................... | H02J 17/00 307/104 |
| 2014/0240947 A1 * | 8/2014 | Nakamura | .......... | B60L 11/1824 361/818 |
| 2014/0366450 A1 * | 12/2014 | Mizuma | ................ | E05F 15/643 49/349 |
| 2015/0130407 A1 * | 5/2015 | Ni | ............................ | H01F 38/14 320/108 |
| 2015/0280455 A1 * | 10/2015 | Bosshard | ................ | H02J 5/005 307/104 |
| 2015/0357828 A1 * | 12/2015 | Ichikawa | ................ | H01F 38/14 307/104 |
| 2015/0357863 A1 * | 12/2015 | Sadakata | ................. | H02J 5/005 320/108 |
| 2016/0001662 A1 * | 1/2016 | Miller | ................... | B60L 11/005 307/104 |
| 2016/0011276 A1 * | 1/2016 | Goma | .................... | G01R 31/00 324/764.01 |
| 2016/0285278 A1 * | 9/2016 | Mehas | ..................... | H02J 50/12 |
| 2016/0315554 A1 * | 10/2016 | Wu | ..................... | G06K 19/0723 |
| 2016/0365752 A1 * | 12/2016 | Misawa | .................. | H02J 7/025 |
| 2017/0047786 A1 * | 2/2017 | Park | ......................... | H02J 50/12 |

* cited by examiner

*Primary Examiner* — M'Baye Diao
(74) *Attorney, Agent, or Firm* — Steven Reiss

(57) ABSTRACT

A wireless charging system uses a transformer to adjust output voltage of the charging antenna to reduce the voltage in the resonant capacitor for a wireless charging coupling.

9 Claims, 3 Drawing Sheets

WIRELESS CHARGING SYSTEM

FIELD

The subject matter herein generally relates to a wireless charging system.

BACKGROUND

For an electromagnetic resonance type of wireless charging technology with long distance transmission capability, it is desirable that the output voltage of the charging module can be increased to achieve optimal charging efficiency.

BRIEF DESCRIPTION OF THE DRAWINGS

Implementations of the present technology will now be described, by way of example only, with reference to the attached figures.

DETAILED DESCRIPTION

Figure 1:
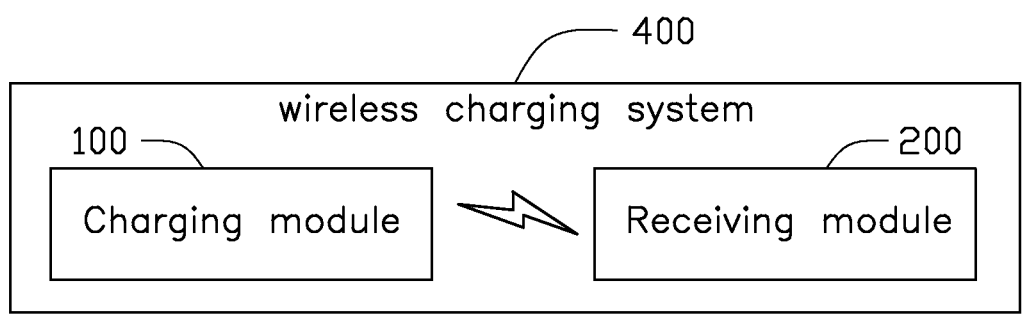
FIG. 1 is a block diagram of an embodiment of a wireless charging system, an electronic device of the wireless charging system comprising a charging module and a receiving module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates an embodiment of a wireless charging system 400 which can comprise a charging module 100 and a receiving module 200.

Figure 2:
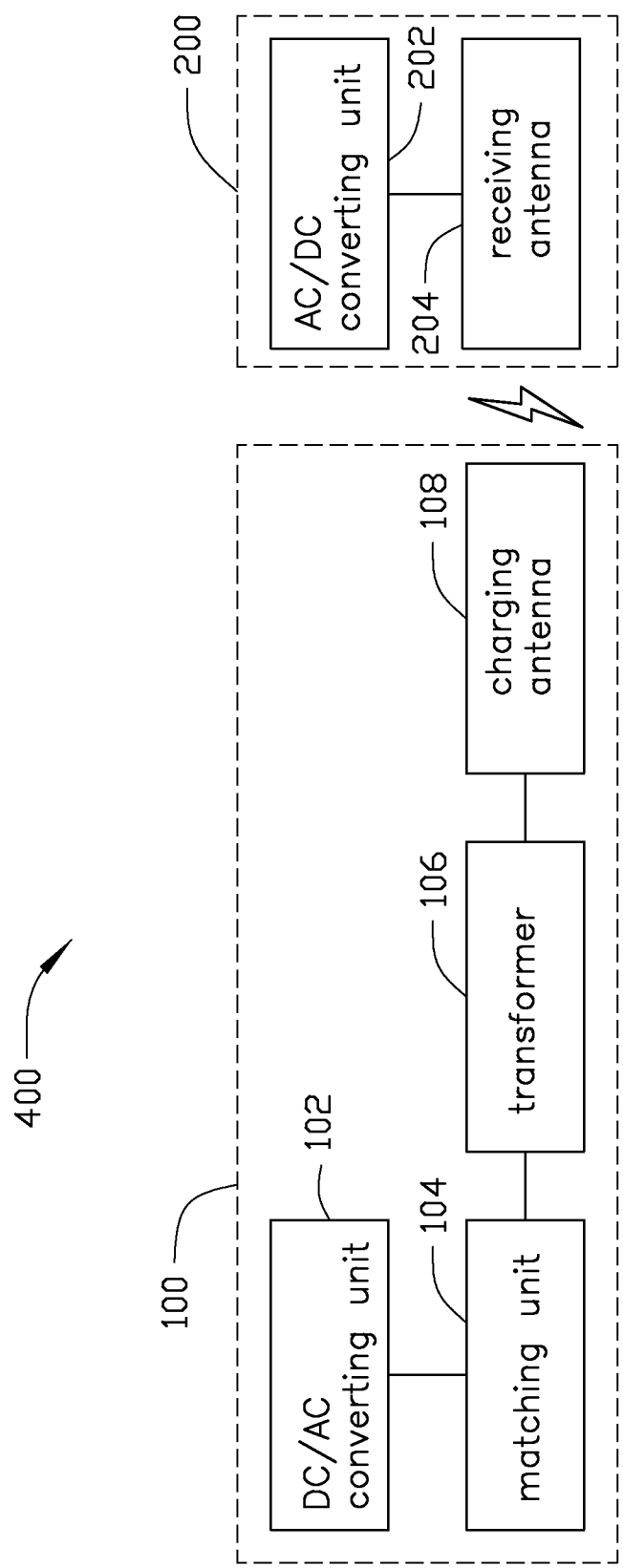
FIG. 2 is a block diagram of an embodiment of the charging module and the receiving module of FIG. 1.

FIG. 2 illustrates an embodiment of the charging module 100 and the receiving module 200. The receiving module 200 can receive power transmitted wirelessly from the charging module 100. The charging module 100 can comprise a DC/AC converting unit 102, a matching unit 104, a transformer 106, and a charging antenna 108.

Figure 3:
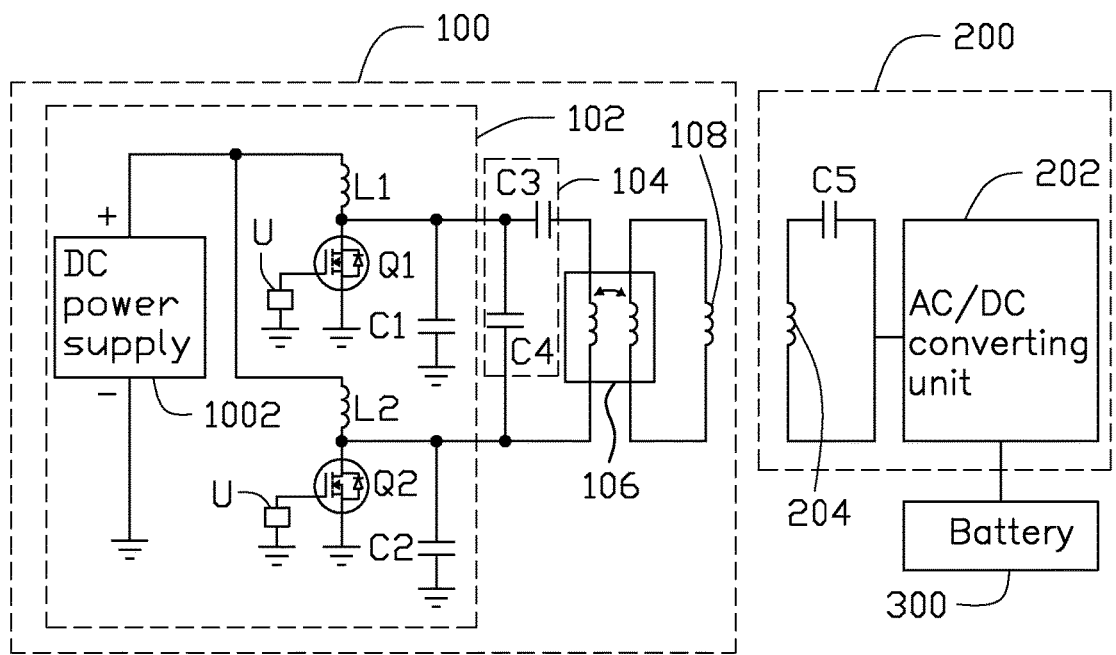
FIG. 3 is a circuit diagram of an embodiment of the charging module and the receiving module of FIG. 2.

FIG. 3 illustrates an embodiment of wireless charging system 400. The DC/AC converting unit 102 is electrically coupled to the matching unit 104. The transformer 106 is electrically coupled between the matching unit 104 and the charging antenna 108. The matching unit 104 is electrically coupled between the DC/AC converting unit 102 and transformer 106.

In at least one embodiment, the receiving module 200 can comprise a receiving antenna 204 and an AC/DC converting unit 202.

In at least one embodiment, the receiving antenna 204 is coupled to the charging antenna 108 to receive power transmitted wirelessly. For instance, the coupling can be achieved via electromagnetic resonance. In the case of electromagnetic resonance, the matching unit 104 in the wireless charging system 400 is configured to match impedance of the charging antenna 108 with that of the receiving antenna 204 and adjust resonance frequencies for resonant coupling.

In at least one embodiment, the DC/AC converting unit 102 can comprise a DC power supply 1002, two inductors L1 and L2, two field effect transistors (FETs) Q1 and Q2, and two capacitors C1 and C2. A cathode of the DC power supply 1002 is grounded. An anode of the DC power supply 1002 is electrically coupled to a drain of the FET Q1 through the inductor L1, and is electrically coupled to a drain of the FET Q2 through the inductor L2. A gate of the FET Q1 is grounded through a controller U. A source of the FET Q1 is grounded. A source of the FET Q2 is grounded. A drain of the FET Q2 is grounded. A gate of the FET Q2 is grounded through another controller U. A first terminal of the capacitor C1 is electrically coupled to a node between the inductor L1 and the FET Q1. A second terminal of the capacitor C1 is grounded. A first terminal of the capacitor C2 is electrically coupled to a node between the inductor L2 and the FET Q2. A second terminal of the capacitor C2 is grounded.

In at least one embodiment, the matching unit 104 can comprise two capacitors C3 and C4. A first terminal of the capacitor C3 is electrically coupled to the node between the inductor L1 and the FET Q1. A second terminal of the capacitor C3 is electrically coupled to a first terminal of a primary coil of the transformer 106. A second terminal of the primary coil of the transformer 106 is electrically coupled to the node between the inductor L2 and the FET Q2. The capacitor C4 is electrically coupled in parallel to the primary coil of the transformer 106. A first terminal of a secondary coil of the transformer 106 is electrically coupled to a first terminal of the charging antenna 108. A second terminal of the secondary coil of the transformer 106 is electrically coupled to a second terminal of the charging antenna 108.

Suitable coupling for a charging antenna in wireless charging technologies is well known to those of ordinary skill in the art.

The receiving antenna 204 is electrically coupled to the AC/DC converting unit 202 through a capacitor C5.

In use, the DC/AC converting unit 102 converts the DC power provided by the DC power supply 1002 into an AC power (such as 2 VAC), and transmits the AC power to the transformer 106. Based on the transformer principle, the transformer 106 can improve the AC power received by the primary coil through adjusting the ratio of turns of the transformer 106. In the meantime, the receiving antenna 204 is coupled to the charging antenna 108 to receive power transmitted wirelessly. The receiving antenna 204 generates an alternating current. The AC/DC inverting unit 202 can convert the alternating current to a direct current to charge the battery 300.

Voltage transmissions which are higher in magnitude, and with transmissability over greater distances in wireless charging technologies is information well known to those of ordinary skill in the art.

When the charging module 100 transmits 2 KV of power to the receiving module 200 wirelessly, the ratio of turns between the primary coil and the secondary coil of the transformer 106 can be 1:20. Thus, the capacitors C3 and C4 of the matching unit 104 can each be under 100 volts.

The embodiments shown and described above are only examples. Many details are often found in the art such as the other features of a wireless charging system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wireless charging system comprising:
   a DC/AC converting unit providing an AC power, wherein the DC/AC converting unit comprises a DC power supply, a first inductor, a first field effect transistor (FET), a first capacitor, and a controller, a cathode of the DC power supply is grounded, an anode of the DC power supply is electrically coupled to a drain of the first FET through the first inductor, a gate of the first FET is grounded through the controller, a source of the first FET is grounded, a first terminal of the first capacitor is electrically coupled to a node between the first inductor and the first FET, and a second terminal of the first capacitor is grounded;
   a transformer having a primary and secondary coil, the transformer obtaining the AC power from the DC/AC converting unit, and enlarging the AC power provided by the DC/AC converting unit according to a ratio of turns between the primary coil and the secondary coil;
   a charging antenna obtaining the enlarged AC power from the transformer; and
   a receiving antenna receiving power transmission wirelessly from the charging antenna.

2. The wireless charging system of claim 1, wherein the receiving antenna receives the power transmission via electromagnetic resonant coupling.

3. The wireless charging system of claim 2, wherein the wireless charging system comprises a matching unit electrically coupled to the charging antenna through the transformer to match impedance with the receiving antenna and adjust resonance frequencies for resonant coupling.

4. The wireless charging system of claim 3, wherein the wireless charging system further comprises an AC/DC converting unit, the AC/DC converting unit converts the AC power generated by the receiving antenna to a DC power to charge a battery.

5. The wireless charging system of claim 4, wherein the DC/AC converting unit comprises a second inductor, a second FET, a second capacitor, a cathode of the DC power supply is grounded, the anode of the DC power supply is electrically coupled to a drain of the second FET through the second inductor, a source of the second FET is grounded, a gate of the second FET is grounded through the controller, a first terminal of the second capacitor is electrically coupled to a node between the second inductor and the second FET, and a second terminal of the second capacitor is grounded.

6. An electronic device, comprising:
   a DC/AC converting unit providing an AC power, wherein the DC/AC converting unit comprises a DC power supply, a first inductor, a first field effect transistor (FET), a first capacitor, and a controller, a cathode of the DC power supply is grounded, an anode of the DC power supply is electrically coupled to a drain of the first FET through the first inductor, a gate of the first FET is grounded through the controller, a source of the first FET is grounded, a first terminal of the first capacitor is electrically coupled to a node between the first inductor and the first FET, a second terminal of the first capacitor is grounded:
   a transformer having a primary and secondary coil, the transformer obtaining the AC power from the DC/AC converting unit, and enlarging the AC power provided by the DC/AC converting unit according to a ratio of turns between the primary coil and the secondary coil;
   a charging antenna obtaining the enlarged AC power from the transformer;
   a receiving antenna receiving power transmission wirelessly from the charging antenna, and
   a matching unit coupling to the charging antenna through the transformer to match impedance with the receiving antenna and adjust resonance frequencies for resonant coupling.

7. The wireless charging system of claim 6, wherein the receiving antenna receives the power transmission via electromagnetic resonant coupling.

8. The wireless charging system of claim 6, wherein the wireless charging system further comprises an AC/DC converting unit, the AC/DC converting unit converts the AC power generated by the receiving antenna to a DC power to charge a battery.

9. The wireless charging system of claim 8, wherein the DC/AC converting unit further comprises a second inductor, a second FET, a second capacitor, a cathode of the DC power supply is grounded, the anode of the DC power supply is electrically coupled to a drain of the second FET through the second inductor, a source of the second FET is grounded, a gate of the second FET is grounded through the controller, a first terminal of the second capacitor is electrically coupled to a node between the second inductor and the second FET, and a second terminal of the second capacitor is grounded.

* * * * *